Patented May 23, 1950

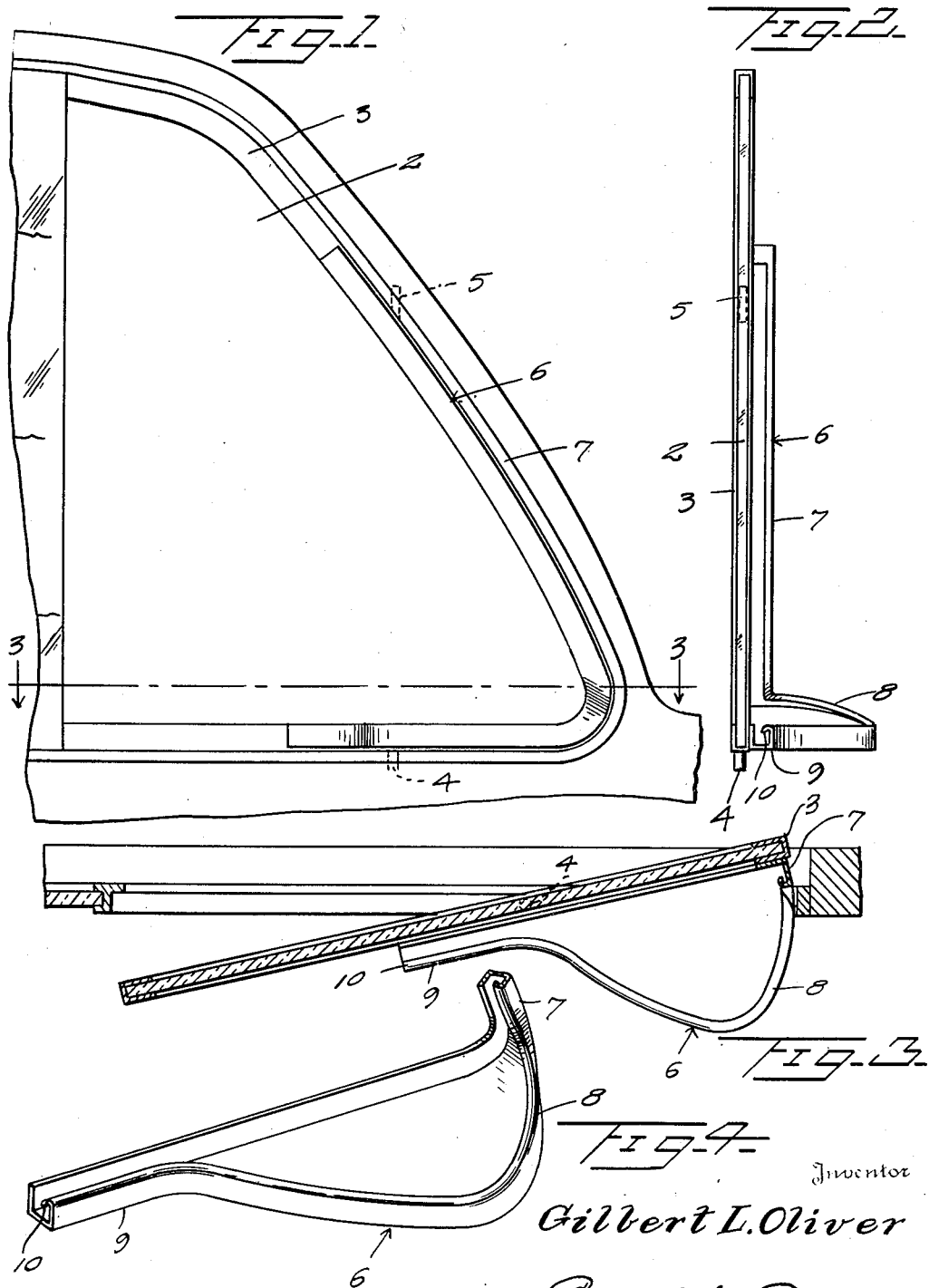

2,508,532

UNITED STATES PATENT OFFICE 2,508,532

VENT GLASS DRAIN

Gilbert L. Oliver, Terry, Miss., assignor of one-half to Ruel Overby, Brandon, Miss.

Application March 14, 1945, Serial No. 582,735

4 Claims. (Cl. 296—44)

The present invention relates to a drainage trough for the side ventilator glasses commonly called vent glasses, now used on many automobiles and forming a part of the front door.

The purpose of the improvement is to keep water from running down the vent glass and/or blowing in on the occupants of the automobile.

Much of the water now dropping on the occupants of a car equipped with vent glass is the result of a draft carrying drops of water along the glass until they accumulate and drop inside the car; this improvement catches this water and disposes of it outside the vehicle.

This invention may be embodied in an extension of the vent glass frame or in a separate piece.

In the drawing—

Figure 1 is a front view of a vent glass equipped with the improvement;

Figure 2 is a rear edge view of such a vent glass;

Figure 3 is a top plan section on line 3—3 of Figure 1, showing the vent glass partially opened;

Figure 4 is a perspective view of my improvement.

A conventional vent glass 2 having a frame 3 has pivot pins 4, 5 secured to the latter and is thereby turnably mounted in the window opening of the front door of an automobile.

The invention, designated generally 6, has an upper portion which lies above the pivot pin 5 and is the upper closed end of a U-shaped trough portion 7 of a curvature like that of the major portion of the front edge of the vent glass.

The bottom or convex side of the trough portion 7 faces forwardly and the concave side thereof faces rearwardly. This curved trough portion 7 merges at its lower end into an enlarged trough portion 8 of the same depth and viewed from above having the general shape of the sector of a circle drawn approximately about the pivot 4. At or near the lower pivot 4 the enlarged portion 8 becomes narrower in width and merges into a portion 9 of a width about equal to that of the trough portion 7.

The outer wall of the trough has an inwardly and downwardly extending flange 10 designed to keep the water within the trough. If the movement of the automobile hurls the water against the inner side of the outer trough wall, this flange acting like the wave breaker on an ocean-going vessel turns it right back.

The enlarged portion and coplanar narrow portion of the trough is placed in a horizontal position and its bottom side rests or slides as the vent glass is opened on the rubber molding of the door. The outer side of the inner wall of the trough may be secured in any suitable manner, as by soldering or welding, to the outer side of the frame 3.

The improvement may also be attached in such a way as to clear entirely the rubber door moulding.

This drawing shows the improvement as an addition or attachment to the regular vent glass metal frame, however it might more readily and easily be manufactured as an integral part of the same.

The width and depth of the troughs including the wider part is to be determined by needs arising out of a particular design of vent glass.

The narrow horizontally disposed portion 9 of the trough is made so as not to scrape on the rubber door moulding when the vent glass is being closed in order not to impair the opening and closing operation of the latter.

It is to be understood that the form of my invention herewith shown and described, is to be taken as a preferred example of the same and that various changes in the shape, size and arrangement of parts may be resorted to without departing from the spirit of my invention or the scope of the subjoined claims.

Having thus described my invention, what I claim as new is:

1. In combination with a ventilator window frame for motor vehicles, a drainage trough comprising a portion of narrow width and U-shaped cross section secured to the outer side of and following the contour of the curved forward edge of such frame downwardly from a point adjacent the top of the window to the bottom thereof, said trough portion opening rearwardly, a horizontally disposed lateraly enlarged portion merging at its forward end into the lower end of the first recited portion and having a coplanar portion of reduced width open at its rear end, and the outer wall of the trough having a flange extending inwardly of the trough and towards the bottom thereof.

2. In combination with a vehicle ventilating panel swingable about a vertical pivot to a position where the forward end portion ahead of the pivot projects into the interior of a vehicle body and establishes a space between said forward end of the panel and said body, a rain drain attached to the lower forward end of the panel and comprising a horizontal portion having a drain surface of such area and shape as to cover the established space when the panel is opened to a considerable extent and extends into the vehicle body, and a vertical trough portion having an upstanding outwardly projecting wall and a rearwardly extending wall coextensive therewith along the forward edge of the panel, said last named portion beginning at a point at least one-fourth the distance up the front of the panel from the lower forward end thereof and extending downwardly from said point along the front edge of the panel to its union with the drain surface to thereby provide means for directing rain downwardly along the forward edge of the panel to the drain surface.

3. In combination with a vehicle ventilating panel swingable about a pivot to a position where the forward end portion ahead of the pivot projects into the interior of a vehicle body and establishes a space between said forward end and the body, a rain drain attached to the lower forward end of the panel and comprising a drain surface narrow at the rear end and of such increasing width to the forward end as to cover the established space when the panel is opened to a considerable extent and extends into the vehicle body, and a flange portion on the outer side edge of the drain surface portion so as to direct water to the narrow rear end of the drain surface.

4. In combination with a vehicle ventilating window swingably supported on a vertical pivot for movement of the window portion forward of the pivot into the interior of the vehicle, a drain trough secured to the outer side of window adjacent its bottom edge and extending from its forward end to beyond the pivot and including a relatively wide forward end, a narrow rear end and an outer upstanding flange coextensive with the outer edge and forward end of the trough, said trough being open at its rear end and closed at its forward end, and said forward end of the trough being arcuate and concentric with the window pivot.

GILBERT L. OLIVER.

REFERENCES CITED

The following references are of record in the file of this patent:

UNITED STATES PATENTS

| Number | Name | Date |
|---|---|---|
| 2,060,109 | Parmenter | Nov. 10, 1936 |
| 2,290,449 | Ramsey | July 21, 1942 |
| 2,354,443 | Schirra | July 25, 1944 |
| 2,369,579 | Kobligk | Feb. 13, 1945 |
| 2,390,260 | King | Dec. 4, 1945 |